United States Patent
Rao et al.

(10) Patent No.: US 12,401,742 B2
(45) Date of Patent: Aug. 26, 2025

(54) LAWFUL INTERCEPTION OF REDIRECTED CALLS

(71) Applicant: Nokia Technologies Oy, Espoo (FI)

(72) Inventors: Nagaraja Rao, Boca Raton, FL (US); Girish Kumar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 429 days.

(21) Appl. No.: 18/150,257

(22) Filed: Jan. 5, 2023

(65) Prior Publication Data
US 2023/0396706 A1 Dec. 7, 2023

(30) Foreign Application Priority Data

Jun. 2, 2022 (IN) .............................. 202241031729

(51) Int. Cl.
| | |
|---|---|
| *H04W 48/18* | (2009.01) |
| *H04L 9/32* | (2006.01) |
| *H04L 9/40* | (2022.01) |
| *H04M 3/22* | (2006.01) |
| *H04L 65/1016* | (2022.01) |
| *H04L 65/1104* | (2022.01) |

(52) U.S. Cl.
CPC ........ *H04M 3/2281* (2013.01); *H04L 9/3213* (2013.01); *H04L 63/302* (2013.01); *H04L 65/1016* (2013.01); *H04L 65/1104* (2022.05)

(58) Field of Classification Search
CPC ..... H04L 5/0051; H04L 5/14; H04L 27/2636; H04W 76/38; H04W 72/1263; H04W 72/232; H04W 74/0833; H04W 72/25; H04W 72/02
See application file for complete search history.

(56) References Cited

U.S. PATENT DOCUMENTS

| | | |
|---|---|---|
| 2019/0174000 A1 | 6/2019 | Bharrat et al. |
| 2020/0252503 A1 | 8/2020 | Li |
| 2021/0203700 A1 | 7/2021 | Asveren et al. |

(Continued)

OTHER PUBLICATIONS

"3rd Generation Partnership Project; Technical Specification Group Services and System Aspects; Security; Lawful Interception (LI) architecture and functions (Release 17)", 3GPP TS 33.127, V17.4.0, Mar. 2022, pp. 1-159.

(Continued)

*Primary Examiner* — Phuoc H Doan
(74) *Attorney, Agent, or Firm* — Nokia Technologies Oy

(57) ABSTRACT

According to an example aspect of the present invention, there is provided an apparatus comprising at least one processor; and at least one memory including computer program code; the at least one memory and the computer program code configured to, with the at least one processor, cause the apparatus at least to function as a point of interception in an application server or border control function of a communication network, receive an incoming protocol message requesting initiation of a call, transmit an outgoing protocol message to advance initiation of the call, and receive a cryptographic token comprising a cryptographically signed identity of a caller initiating the call, and transmit a lawful interception message comprising information on the call to a lawful interception party as a response to at least one trigger being fulfilled.

20 Claims, 5 Drawing Sheets

(56) References Cited

U.S. PATENT DOCUMENTS

| | | |
|---|---|---|
| 2022/0060520 A1 | 2/2022 | Carney Landow et al. |
| 2022/0086276 A1 | 3/2022 | Ranalli |
| 2024/0172224 A1* | 5/2024 | Xiong .................. H04W 72/21 |
| 2024/0214158 A1* | 6/2024 | Wang ................. H04W 72/232 |

OTHER PUBLICATIONS

"3rd Generation Partnership Project; Technical Specification Group Services and System Aspects; Security; Protocol and procedures for Lawful Interception (LI); Stage 3 (Release 17)", 3GPP TS 33.128, V17.4.0, Mar. 2022, pp. 1-321.

"3rd Generation Partnership Project; Technical Specification Group Core Network and Terminals; IP multimedia call control protocol based on Session Initiation Protocol (SIP) and Session Description Protocol (SDP); Stage 3 (Release 17)", 3GPP TS 24.229, V17.6.1, Mar. 2022, pp. 1-1083.

"Signature-based Handling of Asserted information using toKENs (SHAKEN)", Alliance for Telecommunications Industry Solutions, ATIS-1000074.v002, Jul. 12, 2021, 19 pages.

"Signature-based handling of Asserted information using toKENs (SHAKEN): SHAKEN Support of "div" PASSporT", SIP Forum, ATIS-1000085.v002, Sep. 25, 2020, 29 pages.

Chiang et al., "An affordable solution for authenticated communications for enterprise and personal use", IEEE 8th Annual Computing and Communication Workshop and Conference (CCWC), Jan. 8-10, 2018, pp. 810-815.

Peterson et al., "Authenticated Identity Management in the Session Initiation Protocol (SIP)", RFC 8224, Internet Engineering Task Force (IETF), Feb. 2018, pp. 1-46.

Wendt et al., "PASSporT: Personal Assertion Token", RFC 8225, Internet Engineering Task Force (IETF), Feb. 2018, pp. 1-25.

Peterson, "Personal Assertion Token (PASSporT) Extension for Diverted Calls", RFC 8946, Internet Engineering Task Force (IETF), Feb. 2021, pp. 1-17.

Wendt et al., "Personal Assertion Token (PaSSporT) Extension for Signature-based Handling of Asserted information using toKENS (SHAKEN)", RFC 8588, Internet Engineering Task Force (IETF), May 2019, pp. 1-9.

Extended European Search Report received for corresponding European Patent Application No. 23175312.0, dated Nov. 6, 2023, 7 pages.

* cited by examiner

LAWFUL INTERCEPTION OF REDIRECTED CALLS

FIELD

The present disclosure relates to the field of communication technology and implementing lawful interception of communications in a communication network.

BACKGROUND

In communication networks, calls, such as call sessions or data sessions, may convey information which is private in nature. However, in many jurisdictions, legislation provides for the opportunity for lawful interception of contents of calls, to assist in investigating or, in some cases, preventing, criminal activity.

Communication networks should therefore be configured to technically make it possible to lawfully intercept the contents of calls, for example to or from certain communication identities, which are target identities for lawful interception. Examples of communication networks include wired communication networks, wireless communication networks and cellular communication networks. Lawful interception should be implemented in a manner which does not infringe the privacy of users who are not interception targets.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processor; and at least one memory including computer program code; the at least one memory and the computer program code configured to, with the at least one processor, cause the apparatus at least to function as a point of interception in an application server or border control function of a communication network, receive an incoming protocol message requesting initiation of a call, transmit an outgoing protocol message to advance initiation of the call, and receive a cryptographic token comprising a cryptographically signed identity of a caller initiating the call, and transmit a lawful interception message comprising information on the call to a lawful interception party as a response to the following: a diversion header or history information comprised in the incoming protocol message comprises a communication interception target identity such that all the following apply: the apparatus, when processing the incoming protocol message, uses the communication interception target identity or another identity in the diversion header or the history information to interact with a signing application server, a second cryptographic token, being a diversion token comprising at least one identity in the diversion header or the history information of the incoming protocol message in a diversion element of the second cryptographic token is not received in the apparatus from a further node but is received in the apparatus from the signing application server, and the apparatus includes the second cryptographic token in the outgoing protocol message.

According to a second aspect of the present disclosure, there is provided an apparatus comprising at least one processor; and at least one memory including computer program code; the at least one memory and the computer program code configured to, with the at least one processor, cause the apparatus at least to function as a point of interception in an application server or border control function of a communication network, receive an incoming protocol message requesting initiation of a call and transmit an outgoing protocol message to advance initiation of the call, the incoming protocol message comprising a cryptographic token; and transmit a lawful interception message comprising information on the call to a lawful interception party as a response to the following: the apparatus sending the cryptographic token to a verification application server for validation, a validation result is received from the verification application server, and a communication interception target identity is in a request uniform resource identifier and to header of the incoming protocol message.

According to a third aspect of the present disclosure, there is provided a method comprising functioning, by an apparatus, as a point of interception in an application server or border control function of a communication network, receiving an incoming protocol message requesting initiation of a call, transmitting an outgoing protocol message to advance initiation of the call, and receiving a cryptographic token comprising a cryptographically signed identity of a caller initiating the call, and transmitting a lawful interception message comprising information on the call to a lawful interception party as a response to the following: a diversion header or history information comprised in the incoming protocol message comprises a communication interception target identity such that all the following apply: the apparatus, when processing the incoming protocol message, uses the communication interception target identity or another identity in the diversion header or the history information to interact with a signing application server, a second cryptographic token, being a diversion token comprising at least one identity in the diversion header or the history information of the incoming protocol message in a diversion element of the second cryptographic token is not received in the apparatus from a further node but is received in the apparatus from the signing application server, and the apparatus includes the second cryptographic token in the outgoing protocol message.

According to a fourth aspect of the present disclosure, there is provided a method, comprising functioning, by an apparatus, as a point of interception in an application server or border control function of a communication network, receiving an incoming protocol message requesting initiation of a call and transmitting an outgoing protocol message to advance initiation of the call, the incoming protocol message comprising a cryptographic token, and transmitting a lawful interception message comprising information on the call to a lawful interception party as a response to the following: the apparatus sending the cryptographic token to a verification application server for validation, a validation result is received from the verification application server, and a communication interception target identity is in a request uniform resource identifier and to header of the incoming protocol message.

According to a fifth aspect of the present disclosure, there is provided an apparatus comprising means for performing functioning as a point of interception in an application server or border control function of a communication network, receiving an incoming protocol message requesting initiation of a call, transmitting an outgoing protocol message to advance initiation of the call, and receiving a cryptographic token comprising a cryptographically signed identity of a caller initiating the call, and transmitting a lawful interception message comprising information on the call to a lawful interception party as a response to the following: a diversion header or history information comprised in the incoming protocol message comprises a communication interception target identity such that all the following apply: the apparatus, when processing the incoming protocol message, uses the communication interception target identity or another identity in the diversion header or the history information to interact with a signing application server, a second cryptographic token, being a diversion token comprising at least one identity in the diversion header or the history information of the incoming protocol message in a diversion element of the second cryptographic token is not received in the apparatus from a further node but is received in the apparatus from the signing application server, and the apparatus includes the second cryptographic token in the outgoing protocol message.

According to a sixth aspect of the present disclosure, there is provided an apparatus comprising means for performing functioning, as a point of interception in an application server or border control function of a communication network, receiving an incoming protocol message requesting initiation of a call and transmitting an outgoing protocol message to advance initiation of the call, the incoming protocol message comprising a cryptographic token, and transmitting a lawful interception message comprising information on the call to a lawful interception party as a response to the following: the apparatus sending the cryptographic token to a verification application server for validation, a validation result is received from the verification application server, and a communication interception target identity is in a request uniform resource identifier and to header of the incoming protocol message.

According to a seventh aspect of the present disclosure, there is provided a non-transitory computer readable medium comprising program instructions for causing an apparatus to perform at least the following: functioning as a point of interception in an application server or border control function of a communication network, receiving an incoming protocol message requesting initiation of a call, transmitting an outgoing protocol message to advance initiation of the call, and receiving a cryptographic token comprising a cryptographically signed identity of a caller initiating the call, and transmitting a lawful interception message comprising information on the call to a lawful interception party as a response to the following: a diversion header or history information comprised in the incoming protocol message comprises a communication interception target identity such that all the following apply: the apparatus, when processing the incoming protocol message, uses the communication interception target identity or another identity in the diversion header or the history information to interact with a signing application server, a second cryptographic token, being a diversion token comprising at least one identity in the diversion header or the history information of the incoming protocol message in a diversion element of the second cryptographic token is not received in the apparatus from a further node but is received in the apparatus from the signing application server, and the apparatus includes the second cryptographic token in the outgoing protocol message.

According to an eighth aspect of the present disclosure, there is provided a non-transitory computer readable medium comprising program instructions for causing an apparatus to perform at least the following: functioning as a point of interception in an application server or border control function of a communication network, receiving an incoming protocol message requesting initiation of a call and transmitting an outgoing protocol message to advance initiation of the call, the incoming protocol message comprising a cryptographic token, and transmitting a lawful interception message comprising information on the call to a lawful interception party as a response to the following: the apparatus sending the cryptographic token to a verification application server for validation, a validation result is received from the verification application server, and a communication interception target identity is in a request uniform resource identifier and to header of the incoming protocol message.

According to a ninth aspect of the present disclosure, there is provided a computer program configured to cause a method in accordance with at least one of the third or fourth aspects to be performed.

EMBODIMENTS

Herein are disclosed mechanisms to enhance lawful interception, such that fewer calls of lawful interception targets escape interception, that is, cases where interception reports are mistakenly not generated occur less frequently. Further, generation of double interception reports is suppressed, providing a technical benefit in terms of reduced communication network load and processing load, and further, in some cases, lawful interception is more accurately limited such that law enforcement agencies are not sent information they may not be entitled to receive, enhancing privacy of users who are not lawful interception targets. In detail, these technical effects are reached by defining interception report generation triggers more precisely than in prior work. Using these triggers, interception reports are sent more dependably and cases of missing or double interception reports can be greatly reduced.

Figure 1A:
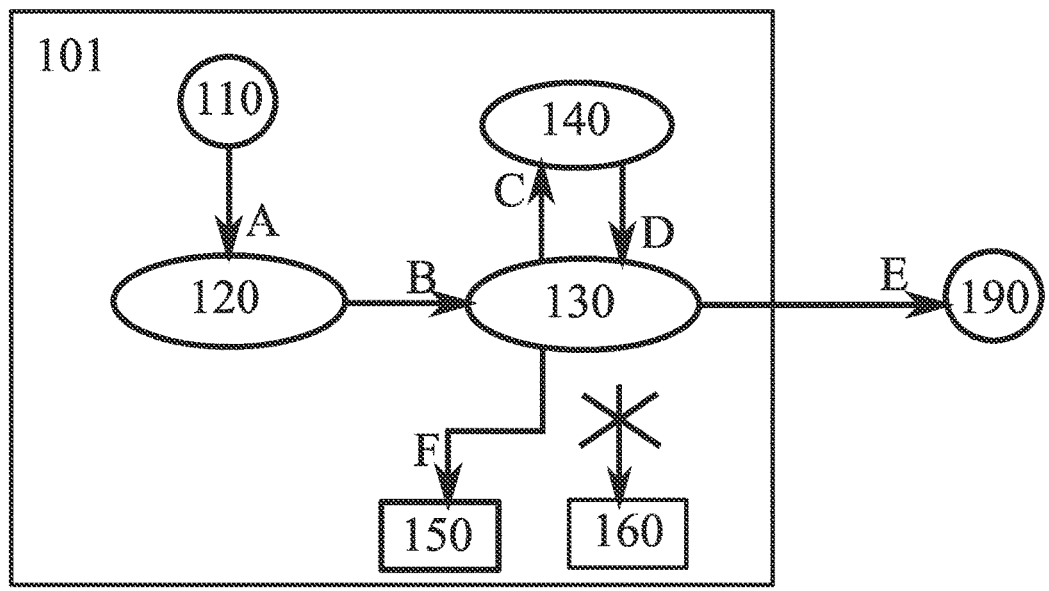
FIG. 1A illustrates signalling in an originating network relevant in understanding the present disclosure.

FIG. 1A illustrates signalling in an originating network relevant in understanding the present disclosure. The signalling relates to a case where a call from an identity, such as phone number or session initiation protocol, SIP, identity, 110 is redirected from the original recipient, the called party, to identity 190. Identity 110 will be referred to herein as the caller.

Initially the call is routed from caller 110 to an application server, AS, 120 of caller 110, denoted A in the figure, and from there to an application server, AS 130 of the called party, denoted arrow B in the figure. Element 130 may alternatively be a border control function, such as an interconnection border control function, IBCF. In the example of FIG. 1A, the caller 110 and called party are in the same network 101. The network may comprise, for example, a 3$^{rd}$ Generation Partnership Project, 3GPP, network implementing internet protocol, IP, multimedia subsystem, IMS.

The call is initiated from caller 110 by transmission of a protocol message, such as, for example, a SIP INVITE message or SIP MESSAGE.

AS 130 of the called party is configured to send the caller 110 and called party identities, such as uniform resource identifiers, URIs, or telephone numbers, to a signing function 140, arrow C, and to receive from signing function 140 a signed cryptographic token, arrow D. A signing function may be a signing application server, for example. This occurs in case intra-network calls are not signed in network 101. Whether intra-network calls are signed or not depends on the way the network is configured. The cryptographic token, such as a personal assertion token, for example, cryptographically verifies an originating identity such as, for example, a uniform resource identifier, URI, or telephone number representing caller 110. The cryptographic token also indicates the identity of the called party. An example of such a personal assertion token is a PASSporT token as described in requests for comments, RFCs, 8225 and 8946 of the Internet Engineering Task Force, IETF. A framework to sign and verify identities in a PASSporT token is laid out in RFC 8588. A PASSporT token signed according to RFC 8588 may be referred to as a "shaken" PASSporT. As the skilled person understands, there are many ways to design the layout of such a token, wherefore the present disclosure is not limited specifically to the PASSporT token in particular. The signed cryptographic token may be signed by signing function 140 according to RFC 8588 in embodiments where the cryptographic token is the PASSporT token, for example, resulting in the "shaken" PASSporT as noted above. RFC 8224 specifies a protocol based on secure telephone identity revisited, STIR, problem statement, enabling secure identification of originators of SIP requests. The signing, which may comprise cryptographic signing, enables authentication of the caller identity in a terminating network in which identity 190 is comprised. In the PASSporT case, such a signature-bearing token may be referred to as a "stir/shaken" token. Additionally, as the AS 130 requests signing of a diversion header, a second cryptographic token, a diversion token, is provided from signing function 140 to AS 130 in phase D. The diversion token comprises indications of caller 110, the called party as well as identity 190 as the destination of the diverted call. The diversion token may also be a PASSporT token, for example, or another cryptographic token with the three identities: the caller identity, original called party identity and the identity to which the call is redirected. The diversion token may be signed by signing function 140. In detail, the diversion token may comprise three identities, an originator identity, a diverting identity and a destination identity. The diverting identity may be referred to as being stored, in the diversion token, in a diversion element. In PASSporT diversion tokens, the diversion element is a "div" claim. In the case of FIG. 1A, the originator identity would be caller 110, the diverting identity would be the called party, and the destination identity would be identity 190.

AS or IBCF 130 may transmit an outgoing protocol message E toward identity 190 in the terminating network, to provide the diverted call to the final intended recipient. The call may be a telephone call, a video call, or a data session, for example. In particular the call may be, or comprise, an IMS session. Message E may comprise both the diversion token and the signed cryptographic token.

In the case of FIG. 1A, the caller 110 is an interception target identity for lawful interception party 150, and the called party is an interception target identity for lawful interception party 160. Lawful interception parties 150, 160 may be law enforcement agencies, such as police departments, or servers of police departments. Lawful interception parties may further comprise equipment of intelligence agencies or border guards, for example, depending on the country. In the figure, and other figures, lines connecting nodes to each other are logical connections which may traverse further nodes which are not illustrated.

Whether AS or IBCF 130 transmits a lawful interception message with information on the call to a lawful interception party depends on lawful interception triggers configured in AS or IBCF 130. When such triggers are present, the AS or IBCF is configured to act as a point of interception, POI. In detail, the triggers may be defined as follows: 1) the AS or IBCF interacts with a signing function, 2) a caller identity in the incoming protocol message is an interception target identity, 3) a cryptographic token is received from the signing function and included in the outgoing protocol message in a SIP identity header, and 4) SIP retargeting creates a new Identity header signed by the signing function and containing a diversion claim to attach to the session. A specific example of the triggers in the context of IMS networking is as follows:

For the originating side:
Telephony AS or IBCF is interacting with a SIGNING AS. Whether it is the Telephony AS or IBCF for sessions is based on network configuration and local policy of the service provider. Whether it is IBCF for MSISDN-less SMS is based on network configuration and local policy of the service provider.
P-Asserted Identity or From header of SIP INVITE or SIP MESSAGE request received from S-CSCF is a target identity.
A PASSporT is received from the SIGNING AS and is included in an outgoing SIP INVITE or SIP MESSAGE request in a SIP Identity header.
Based on RFC 8946, SIP retargeting creates a new Identity header signed by the SIGNING AS and containing the "div" claim to attach to the session For the terminating side:
Either IBCF or Telephony AS, is interacting with the VERIFICATION AS. Whether it is the Telephony AS or IBCF for sessions is based on network configuration and local policy of the service provider. IBCF for MSISDN-less SMS, is based on network configuration and local policy of the service provider.
Request URI and To Headers of SIP INVITE or SIP MESSAGE request received from S-CSCF (in the case of Telephony AS) or from the previous IP network (in the case of IBCF) is a target identity.
If a PASSporT is received in the SIP INVITE or SIP MESSAGE request, it is submitted by the Telephony AS or IBCF to the VERIFICATION AS for validation and the result is included in an outgoing SIP INVITE or SIP MESSAGE request together with possible rich call data, RCD, or enhanced calling name, eCNAM, data as Call-Info headers.

A lawful interception (LI) message, in general and not relating only to FIG. 1A, may comprise an LI X2 Intercept Related Information, xIRI, message in the case of an IMS network. xIRI messages are defined in technical specification 33.128 of the 3GPP. An IMS network may comprise a border control function that will be referred to hereafter as an interconnection border control function, IBCF. The acronym IBCF will be employed here for the sake of brevity, without limitation to 3GPP networks in particular intended.

Using such triggers, in FIG. 1A lawful interception party 150, having caller 110 as a target identity, would receive a lawful interception message F since caller 110 is a target identity, however lawful interception party 160 wouldn't receive a lawful interception message despite the redirecting party number being signed because the conventional trigger only uses the caller identity to send the lawful interception message, since the called party is not the caller identity in the outgoing message E and conventional triggers only check the caller identity. Ideally, lawful interception party 160 would be provided the diversion token in a lawful interception message. Lawful interception message F, which may comprise a signature generation lawful interception message, may comprise both the signed cryptographic token and the diversion token. In some embodiments, message F only comprises these tokens as payload. Further, lawful interception party 150 might be provided the diversion token, whereas it is not clear that lawful interception party 150 is entitled to get the diversion token based on its authority to intercept communications of caller 110. This is a potential privacy problem. Thus, using the triggers described above, lawful interception would not work in an optimal manner in the call redirecting scenario of FIG. 1A.

Figure 1B:
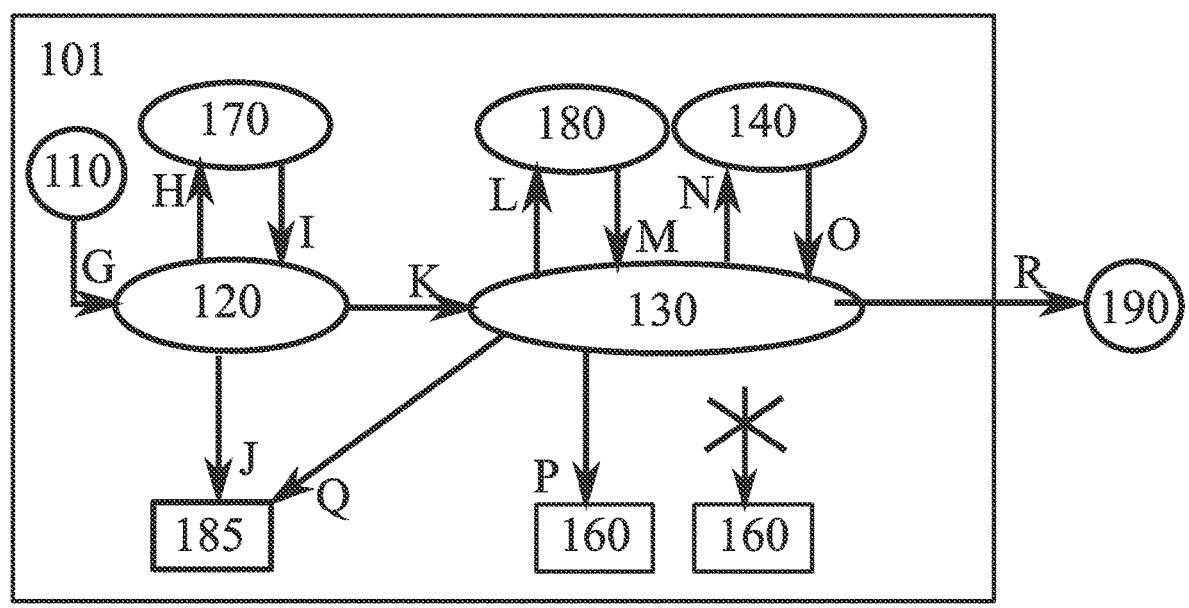
FIG. 1B illustrates signalling in an originating network relevant in understanding the present disclosure.

FIG. 1B illustrates signalling in an originating network relevant in understanding the present disclosure. Like numbering denotes like structure as in FIG. 1A. In this example, intra-network calls are signed.

Caller 110 sends an incoming protocol message G to AS 120 of the caller, which requests signing of the caller's identity from signing function 170 in message H, and receives a signed cryptographic token, such as a "shaken" PASSporT token indicating the origin and called identities, in return in message I. Message H also comprises the called party's identity. This is done, unlike in FIG. 1A, since in this example intra-network calls are signed. Caller 110 is an interception target of interception party 185, wherefore a lawful interception message with information on contents of the call is sent to interception party 185, message J. The outgoing protocol message from the point of view of AS 120, K, comprises the signed cryptographic token, which indicates caller 110 as the originator and the called party as the destination. From the point of view of the AS 130 of the called party, message K is an incoming protocol message.

As message K is signed, AS 130 sends the signed cryptographic token from message K to a verification function 180 configured to verify signatures of signing function 170, message L, and receives in return an indication M that the signature is correct. This may be referred to as a validation result. As the call is redirected to identity 190, AS 130 requests, N, a signature from signing function 140 on the called party's identity (the redirecting party identity), wherein signing function 140 may be the same function or a different function than signing function 170, and receives in return, message O, a diversion token indicating the identities of caller 110, the called party (redirecting party) and identity 190 (redirected-to party), respectively, and the cryptographic token with a cryptographic signature added thereto. Both tokens are included in the outgoing protocol message R toward identity 190. The tokens in FIG. 1B may be PASSporT tokens, for example. The cryptographic token comprising the identities of caller and called parties may comprise a "shaken" PASSporT token, for example.

Concerning the lawful interception parties 160 and 185 in FIG. 1B, lawful interception party 185 has an identity of caller 110 as an interception target and will receive a lawful interception message J from AS 120, having triggered the criteria laid out above in connection with FIG. 1A. Message J comprises the signed cryptographic token received in AS 120 in message I. However, two problems arise in the example of FIG. 1B. Firstly, AS 130 may send a second lawful interception message Q concerning caller 110, message Q comprising the same signed cryptographic token as message J, as well as the diversion token from message O. This duplicates information from message J, requiring deduplication efforts in the system, loads the network unnecessarily with traffic and provides also the diversion token from message O to lawful interception party 185. It may be doubted whether party 185's interception authority extends to obtaining the diversion token, which discloses the identity of redirection target 190, based on its right to intercept communications of caller 110. Further, lawful interception party 160, which as the called party as an interception target, would not receive a lawful interception message with a signed cryptographic token of the called party and the diversion token, denoted by a cross over a message to lawful interception party 160 in FIG. 1B, since the triggers laid out above in connection with FIG. 1A would not be fulfilled. It would only receive message P with a signature validation report, but lacking the diversion token. As such, lawful interception party 160 would only receive a part of the information it should receive under its right to intercept the communications of the called party.

Figure 2A:
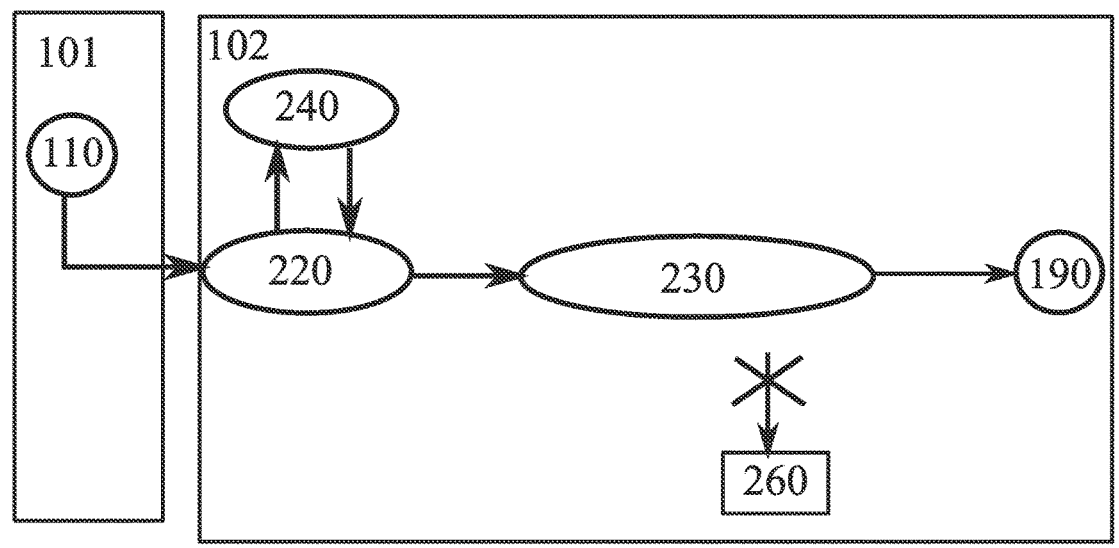
FIG. 2A illustrates signalling in a terminating network relevant in understanding the present disclosure.

FIG. 2A illustrates signalling in a terminating network relevant in understanding the present disclosure. In the example of FIG. 2A, the call of caller 110 is again redirected, now the called party and identity 190, the recipient of the redirected call, are both in the terminating network 102. The incoming protocol message, comprising the signed cryptographic token of caller 110, is received in the terminating network 102. The IBCF or AS of called party 220 refers to verification function 240 to check whether the cryptographic signature in the token is correct, and receives a verification result in return, as illustrated. The called party is not a target of interception in FIG. 2A. However, identity 190 is a target of interception for lawful interception party 260. When the IBCF or AS of called party 220 provides its output protocol message to the AS 230 of identity 190, lawful interception party 260 doesn't get a lawful interception message, as the triggers laid out above in connection with FIG. 1A are not fulfilled. The incoming protocol message into AS 230 has a validation result provided by verification function 240. AS 230 need not verify a signature, as in FIG. 2A intra-network calls are not signed/verified.

Figure 2B:
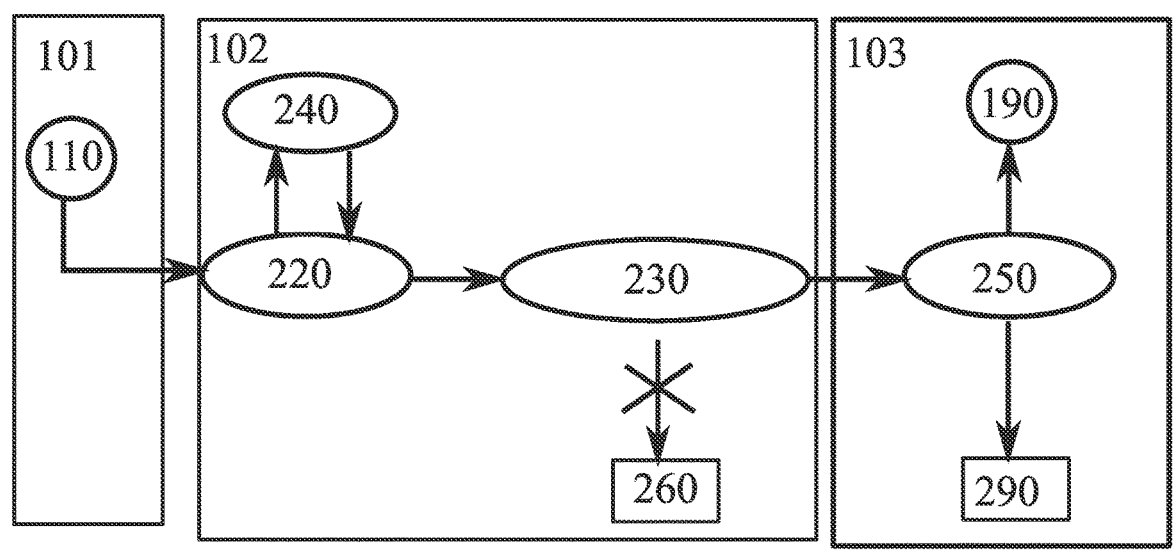
FIG. 2B illustrates signalling in a terminating network relevant in understanding the present disclosure.

FIG. 2B illustrates signalling in a terminating network relevant in understanding the present disclosure. Like numbering denotes like structure as in FIG. 2A. In the case of FIG. 2B, identity 190 is in a visited network 103 and network 102 is a home network of identity 190. The redirected call arrives, from the AS/IBCF 220 of the called party, as an incoming protocol message in AS 230 of identity 190 as in the case of FIG. 2A. AS 230 sends the call to the redirected-to identity 190. The call passes through a proxy call session control function, P-CSCF, 250 in the visited network. In the visited network, a lawful interception mirror IMS state function, LMISF, may access messages passing through the packet core of the visited network.

The protocol message accessed by P-CSCF/LMISF 250 comprises an indication of the validation result from validation function 240. As lawful interception party 290 considers identity 190 an interception target, it receives a lawful interception message from P-CSCF/LMISF 250. In FIG. 2B, as in FIG. 2A, lawful interception party 260 does not receive a lawful interception message since the triggers laid out in connection with FIG. 1A are not fulfilled.

Summing up, in some call redirection scenarios, if a redirecting party, that being the called party, is a target of interception, no delivery of a legal interception message related, for example, to STIR/SHAKEN signing to a legal interception party takes place using normal triggers. Further, in certain scenarios the tokens reported to a lawful interception party may exceed the scope of the interception license of this party. In the terminating network, in redirected call scenarios, when the redirected-to party is a target of interception, the signature validation result may not be provided to the intercepting party in some scenarios and as a result, operational behaviour of legal interception in home and visited networks may be different when the redirected-to party is an interception target. It is the aim of the present disclosure to present optimized triggers which alleviate these problems without causing substantial new problems in legal interception.

In detail, when acting in the originating network and in accordance with the optimized triggers, an AS or IBCF configured to act as a point of interception, POI, transmits a lawful interception message relating to signature generation and/or signature validation to a lawful interception party as a response to the any of the following three situations:

Firstly, a diversion header or history information comprised in the incoming protocol message comprises a communication interception target identity such that all the following apply: the apparatus, when processing the incoming protocol message, uses the communication interception target identity or another identity in the diversion header or the history information to interact with a signing application server, a second cryptographic token, being a diversion token comprising at least one identity in the diversion header or the hi story information of the incoming protocol message in a diversion element of the second cryptographic token is not received in the apparatus from a further node but is received in the apparatus from the signing application server, and the apparatus includes the second cryptographic token in the outgoing protocol message.

Secondly, a caller identity or an identity in a From header in the incoming protocol message is a communication interception target identity, such that the following conditions apply: the caller identity and/or the identity in the From header is used by the apparatus to interact with the signing application server, the cryptographic token is not received from the further node the cryptographic token being received from the signing application server, and the cryptographic token is included in the outgoing protocol message.

Thirdly, a request uniform resource identifier, URI, of the incoming protocol message is a communication interception target identity, such that the following conditions apply: the request URI is used by the apparatus to interact with the signing application server, the third cryptographic token, being a diversion token, received from the signing application server, comprises the request URI in a diversion element, and the third cryptographic token is included in the outgoing protocol message.

In the case of PASSporT tokens in an IMS network, these three triggers may be expressed as:
1) When Diversion header or the History Info of SIP INVITE request received from the S-CSCF, for example in IBCF, is a target identity with the conditions mentioned below:
   The identities in one or both of those headers are used to interact with the Signing AS.
   The "div" PASSporT with those identities in the "div" claim is not received in the SIP INVITE request from the S-CSCF.
   The "div" PASSporT with those identities in the "div" claim is received from the Signing AS.
   The "div" PASSporT with those identities in the "div" claim is included in the outgoing SIP INVITE.
2) When P-Asserted Identity or From header of SIP INVITE or SIP MESSAGE request received from S-CSCF is a target identity with the conditions mentioned below:
   The identities in one or both of those headers are used to interact with the Signing AS.
   The "shaken" PASSporT is not received in the SIP INVITE request from the S-CSCF.
   The "shaken" PASSporT is received from the Signing AS.
   The "shaken" PASSporT is included in the outgoing SIP INVITE or SIP MESSAGE.
3) When Telephony AS is interacting with the Signing AS, and when Request URI of SIP INVITE received from the S-CSCF is a target identity relating to a redirected call with the conditions mentioned below:
   The identity is used to interact with the Signing AS.
   The "div" PASSporT with that identity in the "div" claim is received from the Signing AS.
   The "div" PASSporT with that identity in the "div" claim is included in the outgoing SIP INVITE Based on RFC 8946, SIP retargeting creates a new Identity header signed by the SIGNING AS and containing the "div" claim to attach to the session.

At the terminating network side, the optimized triggers involve an AS or IBCF configured to act as a point of interception, POI, transmitting a lawful interception message to a lawful interception party as a response to the any of the following two situations:

Firstly, the apparatus sending the cryptographic token to a verification application server for validation, a validation result is received from the verification application server, and the AS or IBCF includes in the outgoing protocol message a call information header indicating rich call data and/or enhanced calling name service support.

Secondly, the call is redirected, a communication interception target identity is present in a request uniform resource identifier, URI, of the outgoing protocol message, and a validation result of the cryptographic token is included in the outgoing protocol message.

In the case of PASSporT tokens in an IMS network, these two triggers may be expressed as:
1) If a PASSporT is received in the SIP INVITE or SIP MESSAGE request, it is submitted by the AS to the VERIFICATION AS for validation and the validation result is received from the Verification AS and the outgoing SIP INVITE or SIP MESSAGE possibly includes rich call data, RCD or enhanced calling name service, eCNA, data as Call-Info headers.
2) If session is redirected, Request URI header of outgoing SIP INVITE is a target identity, and validation result is included in the outgoing SIP INVITE with the possible the RCD data and the eCNAM data as Call-Info headers.

Both the originating-network triggers and the terminating-network triggers may be checked also in the other network (terminating, originating), when call redirection and verification take place.

Figure 3:
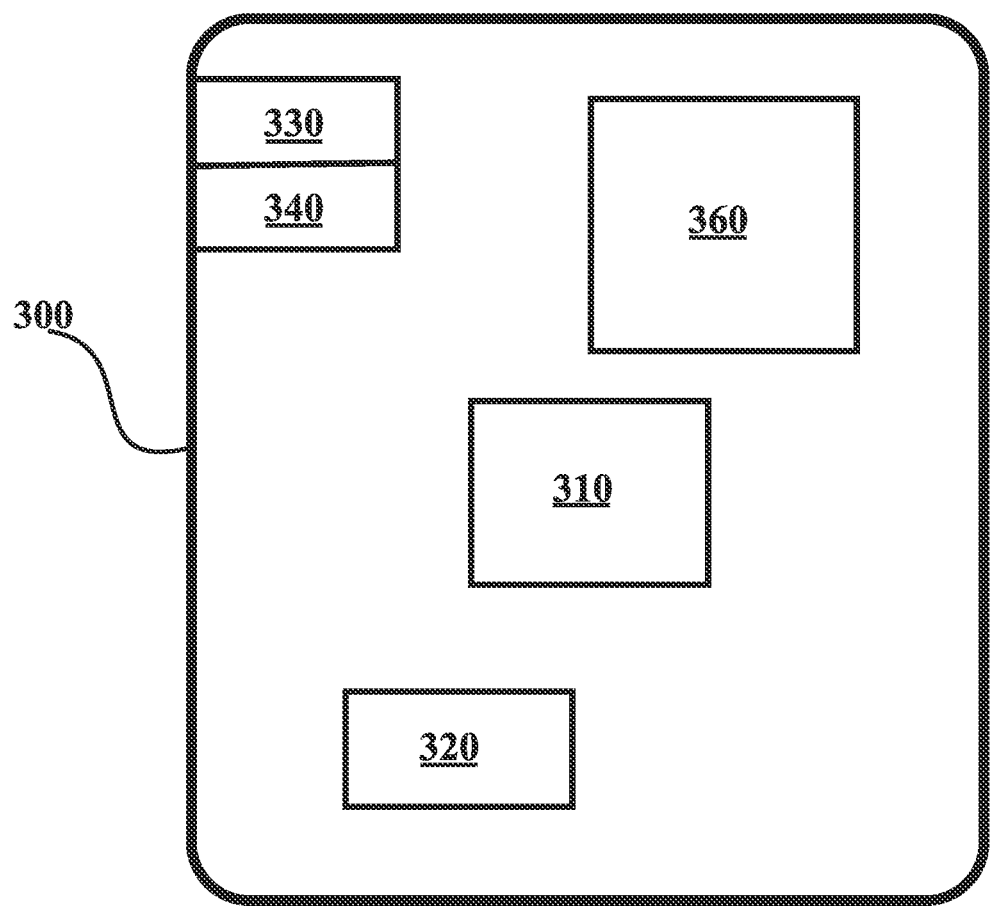
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, computing substrate configured to perform as an AS or IBCF with a POI in FIG. 1A, 1B, 2A or 2B. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as functioning, receiving, transmitting, including and using, for example. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with suitable communication standards.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. Device 300 may comprise a fingerprint sensor arranged to authenticate, at least in part, a user of device 300. In some embodiments, device 300 lacks at least one device described above.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4A:
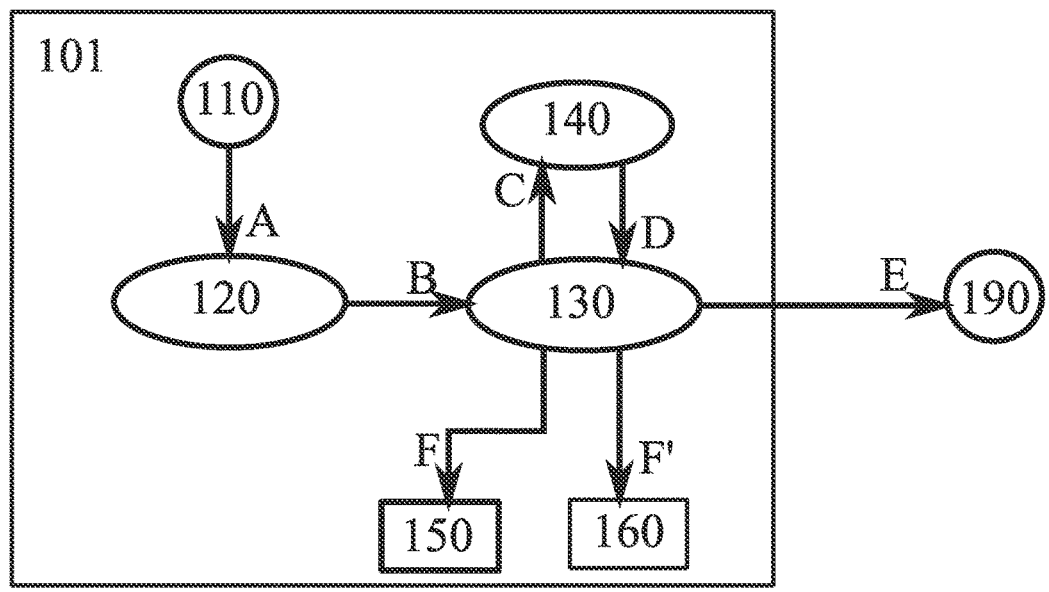
FIG. 4A illustrates a process in accordance with at least some embodiments of the present invention.

FIG. 4A illustrates a process in accordance with at least some embodiments of the present invention. The process resembles that of FIG. 1A, with the exception that lawful interception party 160 is, in this case, provided a lawful interception message F'. The reason for this success is the use of the optimized triggers described herein above, in particular in this case the second trigger on the originating side for message F and the first trigger on the originating side for message F' when node 130 is an IBCF, the third trigger applies when node 130 is an AS. Message F' has the diversion token where the called party is the redirecting party, while message F has a signature generation report concerning caller 110.

Figure 4B:
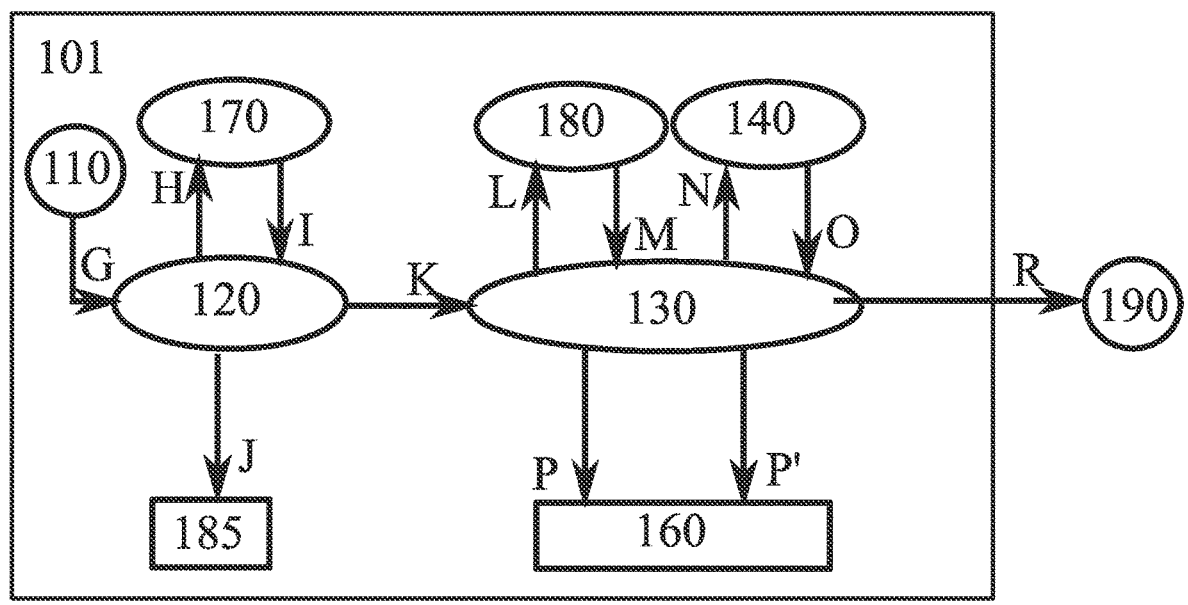
FIG. 4B illustrates a process in accordance with at least some embodiments of the present invention.

FIG. 4B illustrates a process in accordance with at least some embodiments of the present invention. The process resembles that of FIG. 1B, with the exception that lawful interception party 160 is, in this case, provided a lawful interception message P', and lawful interception party 185 is not sent duplicate message Q, present in FIG. 1B. The reason for this success is the use of the optimized triggers described herein above. In particular, the lawful interception message to lawful interception party 185 is triggered by the second originating-side trigger. The two lawful interception messages to lawful interception party 160 are triggered by the third originating-side trigger for message P', relating to signature generation reporting and comprising the diversion token, and the first terminating-side trigger (applied to the originating side) for message P, relating to signature validation.

Similar analysis reveals that the problems in FIGS. 2A and 2B, on the terminating side, are addressed using the optimized triggers presented in the current disclosure.

Figure 5:
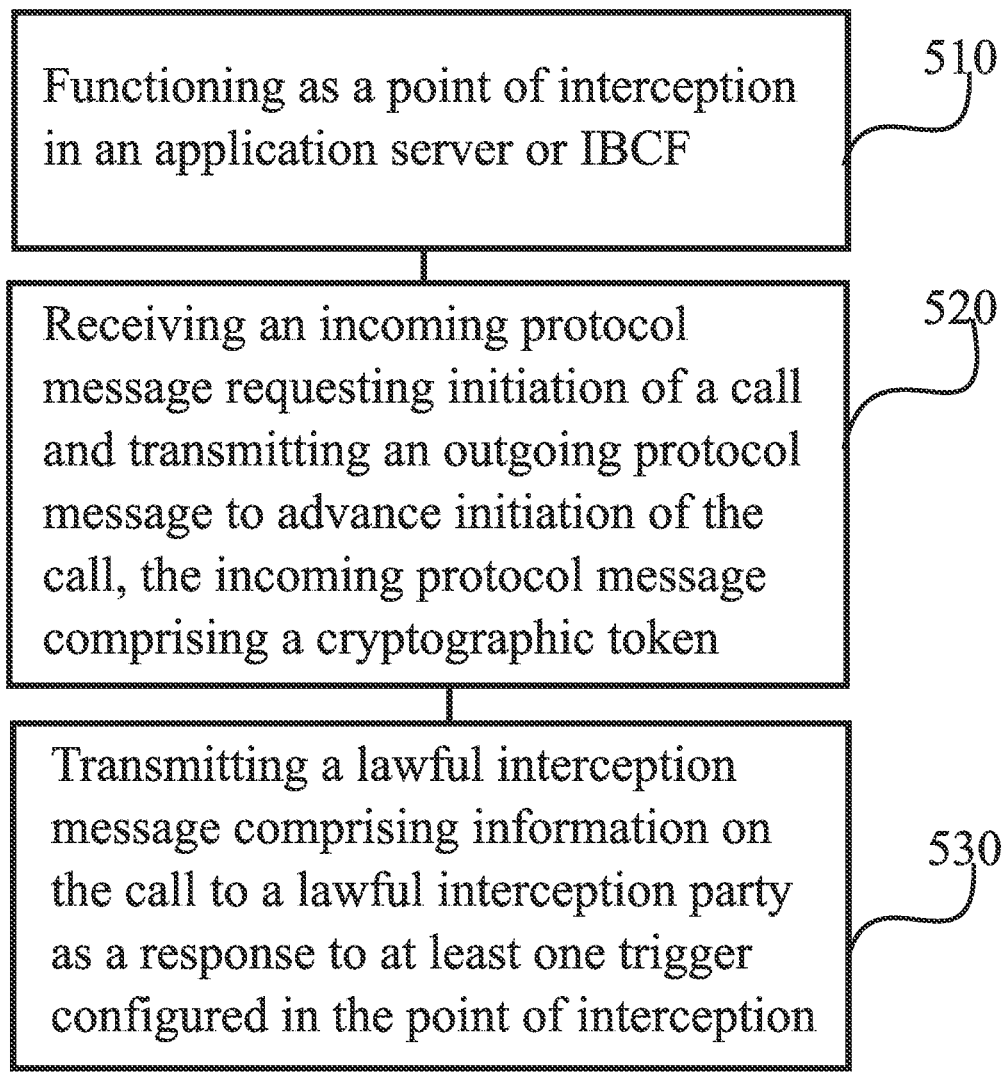
FIG. 5 is a flow graph of a method in accordance with at least some embodiments of the present invention.

FIG. 5 is a flow graph of a method in accordance with at least some embodiments of the present invention. The phases of the illustrated method may be performed in an application server or IBCF, for example, or in a control device configured to control the functioning thereof, when installed therein.

Phase 510 comprises functioning, by an apparatus, as a point of interception in an application server or border control function of a communication network. Phase 520 comprises receiving an incoming protocol message requesting initiation of a call and transmitting an outgoing protocol message to advance initiation of the call, the incoming protocol message comprising a cryptographic token. Phase 530 comprises transmitting a lawful interception message comprising information on the call to a lawful interception party as a response to at least one trigger. The at least one trigger comprises that a diversion header or history information comprised in the incoming protocol message comprises a communication interception target identity such that all the following apply: the apparatus, when processing the incoming protocol message, uses the communication interception target identity or another identity in the diversion header or the history information to interact with a signing application server, a second cryptographic token, being a diversion token comprising at least one identity in the diversion header or the history information of the incoming protocol message in a diversion element of the second cryptographic token is not received in the apparatus from a further node but is received in the apparatus from the signing application server, and the apparatus includes the second cryptographic token in the outgoing protocol message.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing communication networks and privacy therein.

ACRONYMS LIST

3GPP 3$^{rd}$ Generation Partnership Project
AS Application server
IBCF Interconnection border control function
IETF Internet Engineering Task Force PASSporT Personal assertion token
POI Point of interception
RFC Request for quotation
SIP Session initiation protocol

REFERENCE SIGNS LIST

| | |
|---|---|
| 101 | Originating network |
| 102 | Terminating network |
| 103 | Visited network of identity 190 |
| 110 | Caller |
| 120 | AS or IBCF of caller 110 |
| 130, 220 | AS or IBCF of called party |
| 140, 170, 185, 260, 290 | Signing function |
| 150, 160, | Lawful interception party |
| 180, 240 | Verification function |
| 230 | AS or IBCF of identity 190 |
| 250 | P-CSCF/LMISF in visited network 103 |
| 300-360 | Structure of the device in FIG. 3 |
| 510-530 | Phases of the method in FIG. 5 |

The invention claimed is:

1. An apparatus comprising at least one processor; and at least one memory storing instructions that, when executed by the at least one processor, cause the apparatus at least to:
   function as a point of interception in an application server or border control function of a communication network;
   receive an incoming protocol message requesting initiation of a call, transmit an outgoing protocol message to advance initiation of the call, and receive a cryptographic token comprising a cryptographically signed identity of a caller initiating the call; and
   transmit a lawful interception message comprising information on the call to a lawful interception party based on the following:
      a diversion header or history information comprised in the incoming protocol message comprises a communication interception target identity such that all the following apply:
         the apparatus, when processing the incoming protocol message, uses the communication interception target identity or another identity in the diversion header or the history information to interact with a signing application server,
         a second cryptographic token, being a diversion token comprising at least one identity in the diversion header or the history information of the incoming protocol message in a diversion element of the second cryptographic token is not received in the apparatus from a further node but is received in the apparatus from the signing application server, and
         the apparatus includes the second cryptographic token in the outgoing protocol message.

2. The apparatus according to claim 1, wherein the apparatus is further configured to transmit a lawful interception message comprising information on the call to the lawful interception party based on the following:
   a caller identity or an identity in a From header in the incoming protocol message is a communication interception target identity, such that the following conditions apply:
      the caller identity and/or the identity in the From header is used by the apparatus to interact with the signing application server,
      the cryptographic token is not received from the further node the cryptographic token being received from the signing application server, and
      the cryptographic token is included in the outgoing protocol message.

3. The apparatus according to claim 2, wherein the caller identity is a P-asserted identity according to specifications of the $3^{rd}$ Generation Partnership Project.

4. The apparatus according to claim 1, wherein the apparatus is further configured to transmit a lawful interception message comprising information on the call to the lawful interception party based on the following:
   a request uniform resource identifier, URI, of the incoming protocol message is a communication interception target identity, such that the following conditions apply:
      the request URI is used by the apparatus to interact with the signing application server,
      a third cryptographic token, being a diversion token, received from the signing application server, comprises the request URI in a diversion element, and
      the third cryptographic token is included in the outgoing protocol message.

5. The apparatus according to claim 1, wherein the call comprises an internet protocol multimedia subsystem, IMS, session.

6. The apparatus according to claim 1, wherein the lawful interception party comprises a law enforcement agency.

7. The apparatus according to claim 1, wherein the incoming protocol message comprises a session initiation protocol, SIP, invite message.

8. The apparatus according to claim 1, wherein the cryptographic token comprises a personal assertion token, PASSporT, according to request for comments, RFC, 8225 of the Internet Engineering Task Force, IETF.

9. The apparatus according to claim 1, configured to include only a single cryptographic token in the outgoing protocol message, wherein the single included cryptographic token is received in the apparatus from the signing application server.

10. A method comprising:
   functioning, by an apparatus, as a point of interception in an application server or border control function of a communication network;
   receiving an incoming protocol message requesting initiation of a call, transmitting an outgoing protocol message to advance initiation of the call, and receiving a cryptographic token comprising a cryptographically signed identity of a caller initiating the call; and
   transmitting a lawful interception message comprising information on the call to a lawful interception party based on the following:
      a diversion header or history information comprised in the incoming protocol message comprises a communication interception target identity such that all the following apply:
         the apparatus, when processing the incoming protocol message, uses the communication interception target identity or another identity in the diversion header or the history information to interact with a signing application server,
         a second cryptographic token, being a diversion token comprising at least one identity in the diversion header or the history information of the incoming protocol message in a diversion element of the second cryptographic token is not received in the apparatus from a further node but is received in the apparatus from the signing application server, and the apparatus includes the second cryptographic token in the outgoing protocol message.

11. The method according to claim 10, further comprising transmitting a lawful interception message comprising information on the call to the lawful interception party based on the following:

a caller identity or an identity in a From header in the incoming protocol message is a communication interception target identity, such that the following conditions apply:

the caller identity and/or the identity in the From header is used by the apparatus to interact with the signing application server, the cryptographic token is not received from the further node the cryptographic token being received from the signing application server, and the cryptographic token is included in the outgoing protocol message.

12. The method according to claim 11, wherein the caller identity is a P-asserted identity according to specifications of the 3 rd Generation Partnership Project.

13. The method according to claim 10, further comprising transmitting a lawful interception message comprising information on the call to the lawful interception party based on the following:

a request uniform resource identifier, URI, of the incoming protocol message is a communication interception target identity, such that the following conditions apply:

the request URI is used by the apparatus to interact with the signing application server, a third cryptographic token, being a diversion token, received from the signing application server, comprises the request URI in a diversion element, and the third cryptographic token is included in the outgoing protocol message.

14. The method according to claim 10, wherein the call comprises an internet protocol multimedia subsystem, IMS, session.

15. The method according to claim 10, wherein the lawful interception party comprises a law enforcement agency.

16. The method according to claim 10, wherein the incoming protocol message comprises a session initiation protocol, SIP, invite message.

17. The method according to claim 10, wherein the cryptographic token comprises a personal assertion token, PASSporT, according to request for comments, RFC, 8225 of the Internet Engineering Task Force, IETF.

18. The method according to claim 10, further comprising including only a single cryptographic token in the outgoing protocol message, wherein the single included cryptographic token is received in the apparatus from the signing application server.

19. A non-transitory computer readable medium comprising program instructions for causing an apparatus to perform at least the following:

functioning as a point of interception in an application server or border control function of a communication network;

receiving an incoming protocol message requesting initiation of a call, transmit an outgoing protocol message to advance initiation of the call, and receiving a cryptographic token comprising a cryptographically signed identity of a caller initiating the call; and transmitting a lawful interception message comprising information on the call to a lawful interception party based on the following:

a diversion header or history information comprised in the incoming protocol message comprises a communication interception target identity such that all the following apply:

the apparatus, when processing the incoming protocol message, uses the communication interception target identity or another identity in the diversion header or the history information to interact with a signing application server, a second cryptographic token, being a diversion token comprising at least one identity in the diversion header or the history information of the incoming protocol message in a diversion element of the second cryptographic token is not received in the apparatus from a further node but is received in the apparatus from the signing application server, and the apparatus includes the second cryptographic token in the outgoing protocol message.

20. The non-transitory computer readable medium according to claim 19, further comprising program instructions for causing the apparatus to perform at least the following:

transmitting a lawful interception message comprising information on the call to a lawful interception party based on the following:

a caller identity or an identity in a From header in the incoming protocol message is a communication interception target identity, such that the following conditions apply:

the caller identity and/or the identity in the From header is used by the apparatus to interact with the signing application server, the cryptographic token is not received from the further node the cryptographic token being received from the signing application server, and the cryptographic token is included in the outgoing protocol message.

\* \* \* \* \*